United States Patent
Kumar et al.

(10) Patent No.: US 10,776,736 B2
(45) Date of Patent: Sep. 15, 2020

(54) SYSTEM AND METHOD FOR MANAGING DIGITAL MATURITY OF AN ORGANIZATION

(71) Applicant: Tata Consultancy Services Limited, Mumbai (IN)

(72) Inventors: Nagendra Kumar, Noida (IN); Parthapratim Indra, Kolkatta (IN)

(73) Assignee: Tata Consultancy Services Limited, Mumbai (IN)

( * ) Notice: Subject to any disclaimer, the term of this patent is extended or adjusted under 35 U.S.C. 154(b) by 551 days.

(21) Appl. No.: 15/040,610

(22) Filed: Feb. 10, 2016

(65) Prior Publication Data

US 2016/0260037 A1    Sep. 8, 2016

(30) Foreign Application Priority Data

Mar. 5, 2015  (IN) .......................... 731/MUM/2015

(51) Int. Cl.
*H04L 1/00*   (2006.01)
*G06Q 10/06*  (2012.01)

(52) U.S. Cl.
CPC .............................. *G06Q 10/0637* (2013.01)

(58) Field of Classification Search
None
See application file for complete search history.

(56) References Cited

U.S. PATENT DOCUMENTS

| | | | | |
|---|---|---|---|---|
| 7,565,305 B2* | 7/2009 | Shipley | ................. | G06Q 10/06 |
| | | | | 705/7.27 |
| 7,761,316 B2* | 7/2010 | Ligon | ................ | G06Q 10/0639 |
| | | | | 705/7.29 |
| 8,869,116 B2* | 10/2014 | Fliek | ................... | G06F 11/3672 |
| | | | | 714/31 |
| 2003/0018519 A1* | 1/2003 | Balz | ..................... | G06Q 10/063 |
| | | | | 703/6 |
| 2005/0027550 A1 | 2/2005 | Pritchard et al. | | |
| 2010/0250297 A1* | 9/2010 | Channabasavaiah | .. | G06Q 10/06 |
| | | | | 705/70 |
| 2011/0066486 A1* | 3/2011 | Bassin | .................. | G06Q 10/00 |
| | | | | 705/14.43 |
| 2012/0101872 A1* | 4/2012 | Iyengar | ............ | G06Q 10/06393 |
| | | | | 705/7.39 |
| 2013/0166459 A1* | 6/2013 | Mohanty | ................ | G06Q 10/10 |
| | | | | 705/310 |
| 2013/0290073 A1* | 10/2013 | Bassin | .................. | G06Q 10/00 |
| | | | | 705/7.37 |

(Continued)

*Primary Examiner* — Thomas L Mansfield
(74) *Attorney, Agent, or Firm* — Finnegan, Henderson, Farabow, Garrett & Dunner LLP (57) ABSTRACT

Disclosed is a method and system for managing digital maturity by an organization. The system may receive inputs related to digital adoption by an organization. The system may process the inputs using an assessment model. The assessment model may comprise assessment dimensions, assessment sub-dimensions, and assessment characteristics. Based on the processing of the inputs, the system may determine digital maturity results. The digital maturity results may comprise current digital maturity levels, target digital maturity levels, and digital maturity gaps. The system may suggest steps for achieving the target maturity levels, in order to improve digital maturity of the organization.

11 Claims, 4 Drawing Sheets

(56) References Cited

U.S. PATENT DOCUMENTS

| | | | |
|---|---|---|---|
| 2014/0201714 A1* | 7/2014 | Vaidyan | G06F 11/3668 717/124 |
| 2015/0058096 A1* | 2/2015 | Clay | G06Q 10/06395 705/7.41 |
| 2016/0110673 A1* | 4/2016 | Kunapuli | G06Q 10/06393 705/7.39 |

* cited by examiner

SYSTEM AND METHOD FOR MANAGING DIGITAL MATURITY OF AN ORGANIZATION

PRIORITY CLAIM

This U.S. patent application claims priority under 35 U.S.C. § 119 to: India Application No. 731/MUM/2015, filed on 5 Mar. 2015. The entire contents of the aforementioned application are incorporated herein by reference.

TECHNICAL FIELD

The present subject matter described herein, in general, relates to managing digital maturity of an organization.

BACKGROUND

The term digitalization, in an organization, is generally related either to products or to services offered by the organization. Digitalization may also refer to an online experience delivered to customers, by the organization. But in modern times, the concept of digitalization has gone far beyond digitalizing products and services offered by the organization. Digitalization now encompass entire business model in addition to the existing range of business capabilities including operational processes and workplace. It may be challenging for a business leader of any organization to identify key areas of digitalization of the organization. Further, it may also be tedious to define steps for improving a state of digitalization of the organization.

SUMMARY

Embodiments of the present disclosure present technological improvements as solutions to one or more of the above-mentioned technical problems recognized by the inventors in conventional systems. For example, in one embodiment, a method for managing digital maturity of an organization is disclosed. The method may comprise receiving inputs related to digital adoption by an organization. The method may comprise processing the inputs using an assessment model comprising assessment dimensions, assessment sub-dimensions, and assessment characteristics. The assessment dimensions may indicate tracks of digital adoption. The assessment sub-dimensions may indicate focus areas related to the tracks. The assessment characteristics may indicate capability criteria's related to the tracks. The method may further comprise determining digital maturity results based on the processing of the inputs. The digital maturity gaps may be related to the assessment dimensions and the assessment sub-dimensions. The digital maturity results may comprise current digital maturity levels, target digital maturity levels, and digital maturity gaps. The method may further comprise suggesting steps for achieving the target digital maturity levels. Thus, the digital maturity of an organization may be managed, in an above described manner.

In another embodiment, a system for managing digital maturity of an organization is disclosed. The system comprises a processor and a memory coupled to the processor for executing programmed instructions stored in the memory. The processor may receive inputs related to digital adoption by an organization. The processor may further process the inputs using an assessment model comprising assessment dimensions, assessment sub-dimensions, and assessment characteristics. The assessment dimensions may indicate tracks of digital adoption. The assessment sub-dimensions may indicate focus areas related to the tracks. The assessment characteristics may indicate capability criteria's related to the tracks. The processor may further determine digital maturity results based on the processing of the inputs. The current digital maturity levels, the target digital maturity levels, and the digital maturity gaps may be related to the assessment dimensions and the assessment sub-dimensions. The digital maturity results may comprise current digital maturity levels, target digital maturity levels, and digital maturity gaps. The processor may further suggest steps for achieving the target digital maturity levels. Thus, the digital maturity of an organization may be managed, in an above described manner.

In another embodiment, a non-transitory computer readable medium embodying a program executable in a computing device for managing digital maturity of an organization is disclosed. The program may comprise a program code for receiving inputs related to digital adoption by an organization. The program may further comprise a program code for processing the inputs using an assessment model comprising assessment dimensions, assessment sub-dimensions, and assessment characteristics. The assessment dimensions may indicate tracks of digital adoption. The assessment sub-dimensions may indicate focus areas related to the tracks. The assessment characteristics may indicate capability criteria's related to the tracks. The program may further comprise a program code for determining digital maturity results based on the processing of the inputs. The digital maturity results may be related to the assessment dimensions and the assessment sub-dimensions. The digital maturity results may comprise current digital maturity levels, target digital maturity levels, and digital maturity gaps. The program may further comprise a program code for suggesting steps for achieving the target digital maturity levels. Thus, the digital maturity of an organization may be managed, in an above described manner.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for managing digital maturity of an organization. The system may receive inputs related to digital adoption by an organization. The system may process the inputs using an assessment model. The assessment model may comprise assessment dimensions, assessment sub-dimensions, and assessment characteristics. The assessment dimensions may indicate tracks of digital adoption. The sub-dimensions may indicate focus areas related to the tracks. The assessment characteristics may indicate capability criteria's related to the tracks.

The system may determine digital maturity results based on the processing of the inputs. The digital maturity results may be related to the assessment dimensions and the assessment sub-dimensions. The digital maturity results may comprise current digital maturity levels, target digital maturity levels, and digital maturity gaps. Further, each of the current digital maturity levels and the target digital maturity levels are at least one of basic, silo'ed, integrated, responsive, and disruptive. The system may suggest steps for achieving the target digital maturity levels related to the assessment dimensions and the assessment sub-dimensions.

While aspects of described system and method for managing digital maturity of an organization may be implemented in any number of different computing systems, environments, and/or configurations, the embodiments are described in the context of the following exemplary system.

Figure 1:
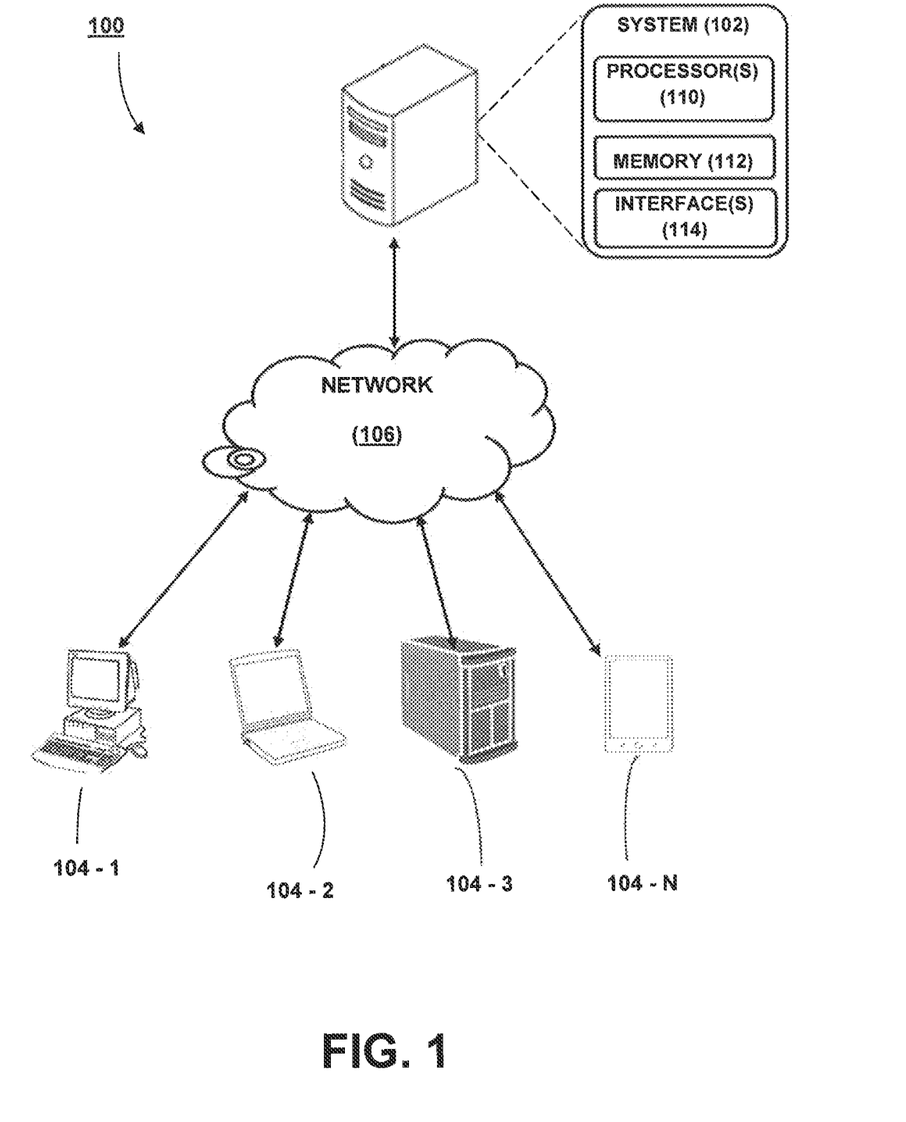
FIG. 1 illustrates a network implementation of a system for managing digital maturity of an organization, in accordance with an embodiment of the present subject matter.

Referring now to FIG. 1, the system 102 for managing digital maturity of an organization is shown, in accordance with an embodiment of the present subject matter. Although the present subject matter is explained considering that the system 102 is implemented on a computer, it may be understood that the system 102 may also be implemented in a variety of computing systems including but not limited to, a smart phone, a tablet, a notepad, a personal digital assistant, a handheld device, a laptop computer, a notebook, a workstation, a mainframe computer, a server, and a network server.

Figure 2:
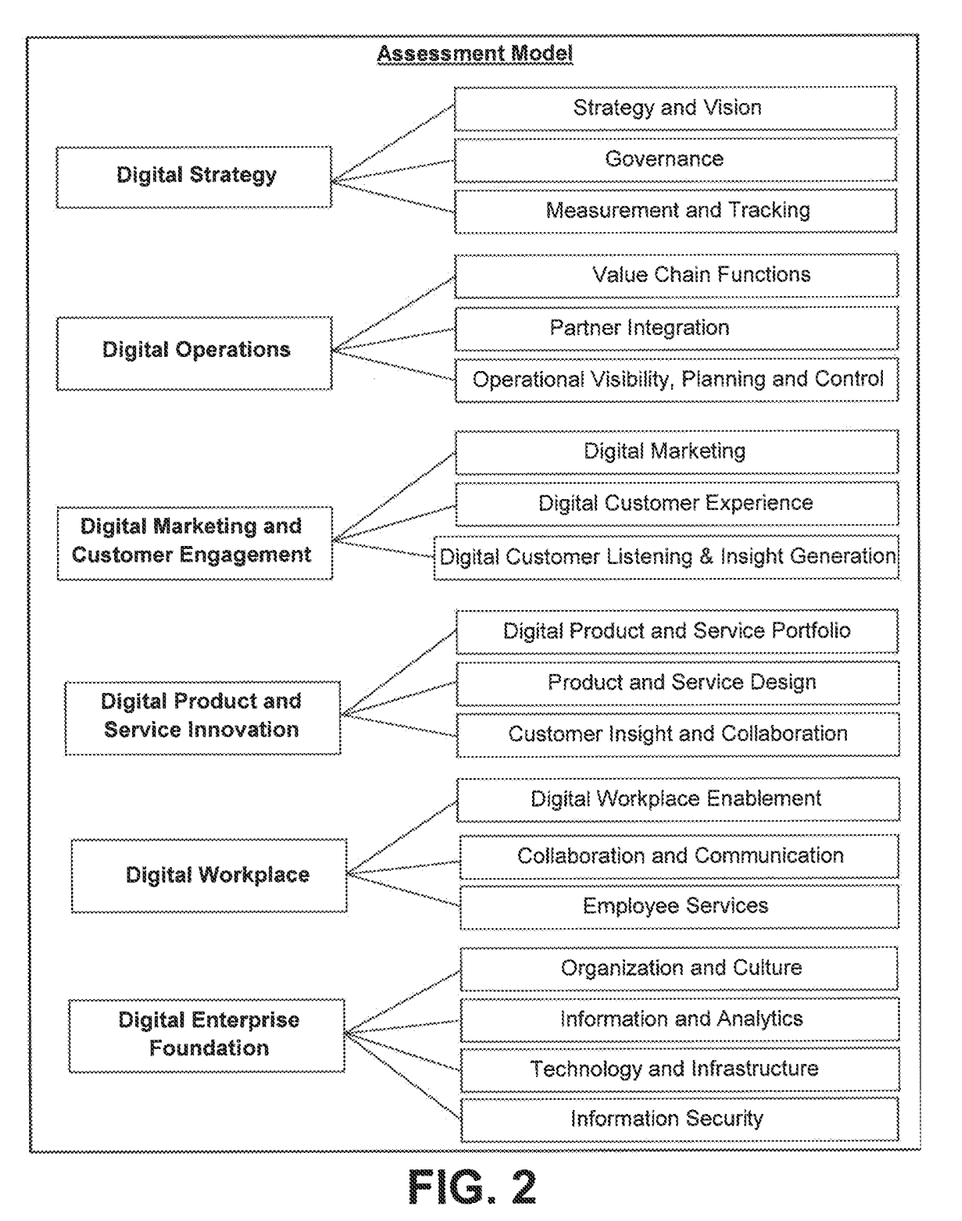
FIG. 2 illustrates an assessment model for determining digital maturity of an organization, in accordance with an embodiment of the present subject matter.

In one embodiment, as illustrated using FIG. 2, the system 102 may include at least one processor 110, a memory 112, and input/output (110) interfaces 114. Further, the at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interfaces 114 may include a variety of software and hardware interfaces, for example, a web interface, a graphical user interface, and the like. The I/O interfaces 114 may allow the system 102 to interact with a user directly. Further, the I/O interfaces 114 may enable the system 102 to communicate with other computing devices, such as web servers and external data servers (not shown). The I/O interfaces 114 can facilitate multiple communications within a wide variety of networks and protocol types, including wired networks, for example, LAN, cable, etc., and wireless networks, such as WLAN, cellular, or satellite.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the system 102 may assist in improve a state of digitalization of an organization. The system may focus on use of modern digital technologies like social media, mobile, storage and processing over cloud, advanced analytics, and embedded devices. Adoption of these modern digital technologies may help the organization to open new ways of entering into a business market, eliminating traditional industry boundaries, and changing customer expectations. Each organization needs to adopt these modern digital technologies in order to outperform their market competitors. Adoption of these modern digital technologies also helps an organization to improve performance of products, and services delivered.

In one embodiment, the system may receive inputs related to digital adoption by an organization. In one embodiment, a questionnaire may be presented by the system to a user. The user may provide responses to the questions. The responses provided by the user may be identified as the inputs to the system. In another embodiment, the inputs may be provided to the system in form of a document comprising details related to digital adoption by the organization. For example, the questionnaire may comprise a question as "what are the focus areas of digitalization." As an answer to the question, the user may input "mobile and analytics." For another example, the question may be "what capabilities are there to monitor insured risk profile using analytics on social media." In response to the question, the user may input "we do not have such capabilities."

Subsequent to receiving the inputs from the user, the system may process the inputs using an assessment model. Referring to FIG. 2, the assessment mod& for determining a maturity level of the organization is explained. The assessment model may comprise assessment dimensions, assessment sub-dimensions, and assessment characteristics. The assessment dimensions may indicate tracks of digital adoption. The assessment sub-dimensions related to the assessment dimensions of the assessment model may indicate focus areas related to the tracks. The assessment characteristics may indicate capability criteria's related to the tracks. Further, weights may be assigned to the assessment dimensions, assessment sub-dimensions and the assessment characteristics based on an importance for digital adoption by the organization. The weights assigned by the system may include Low (1), Medium (2), and High (3) weights. In one embodiment, 6 assessment dimensions may be defined in the assessment model. The assessment dimensions may comprise i) digital strategy, digital operations, iii) digital marketing and customer engagement, iv) digital product and service innovation, v) digital workplace, and vi) digital enterprise foundation.

In one embodiment, the assessment sub-dimensions related to the digital strategy may comprise i) a strategy and a vision, governance, and iii) measurement and tracking. The assessment dimension digital strategy may be used to evaluate clarity, breadth, and consistency of vision and objectives for digitalization of the organization. The digital strategy may be used to evaluate overall process of digital strategy development and governance of the organization with respect to the digital strategy and Key Performance Indicators (KPI's) defined in the assessment model.

In one embodiment, the assessment sub-dimensions related to the digital operations may comprise i) value chain functions, ii) partner integration, and iii) operational visibility, planning, and control. The assessment dimension digital operations may be used to determine a current level of use of digital capabilities of the organization. The digital capabilities of the organization may be used for cost optimization, reduce risks, increase process efficiency, and to improve business agility. Cost optimization may refer to digital delivery of products or information to reduce distribution costs. For example, use of drones to deliver pizza or e-books purchased by customers. Performing analytical operations on data of the organization may help in identifying real-time information about operation inefficiencies related to the organization. For example, inventory levels across a value chain of the organization and procurement costs across vendors may be identified as the operation inefficiencies. Further, cost optimization may also refer to reduced Information Technology (IT) infrastructure costs by use of cloud based business applications. The reduced risks may be related to potential issues and losses associated with the organization. Thus, the digital operations may evaluate a use of business analytics and demand planning capabilities in order to manage risks and build real-time operational visibility and control related to processes of the organization.

In another embodiment, the assessment sub-dimensions related to the digital marketing and customer engagement may comprise i) digital marketing, ii) digital customer experience, and iii) digital customer listening and insight generation. The assessment dimension digital marketing and customer engagement may be related to a use of digital capabilities of the organization. The digital capabilities of the organization may be used to establish connection with customers, driving marketing communications in an effective manner, and improving customer acquisition and retention using differentiated customer experiences. The digital marketing and customer engagement may help in determining an ability of the organization to capture customer preferences and customer feedback.

In one embodiment, the assessment sub-dimensions related to the digital product and service innovation may comprise i) digital product and service portfolio, ii) product and service design, and iii) customer insight and collaboration. The assessment dimension digital product and service innovation may be used to evaluate an ability of the organization to leverage digital capabilities for innovation of a product or a service. Leveraging the digital capabilities may help in enhancing existing products and services by using digital technologies, Thus, leveraging the digital capabilities may help in developing digitally enabled products and integration with numerous digital service providers. The assessment dimension digital product and service innovation may help in assessing a design of products and services offered by the organization. The design of products and services may be assessed to enable a customer centric collaboration and innovation by connecting customers, employees and partners of the organization.

In another embodiment, the assessment sub-dimensions related to the digital workplace may comprise i) digital workplace enablement, ii) collaboration and communication, and iii) employee services. The assessment dimension digital workplace may be used to determine usage of digital capabilities for improving productivity and working experience of an employee. In a case, digital productivity applications may be used, Bring Your Own Device (BYOD) policy may be implemented, role based information access may be provided, and communication through social platforms may be provided, to the employees of the organization. Further, with reference to the assessment dimension digital workplace, workplace processes and delivery of services of the employees may be digitalized, in the organization.

In yet another embodiment, the assessment sub-dimensions related to the digital enterprise foundation may comprise i) organization and culture, ii) information and analytics, iii) technology and infrastructure, and iv) information security. The assessment dimension digital enterprise foundation may be cover core building blocks needed for digitalization of the organization. The assessment dimension digital enterprise foundation may include technology platforms and infrastructure needed to establish digital capabilities like mobile, analytics, and cloud. Further, the assessment dimension digital enterprise foundation may include organizational and cultural aspects that go a long way in truly realizing value from the digital capabilities. The organizational and the cultural aspects may be relevant in building an enabling environment for the adoption of digitalization across the organization. For example, an innovative and customer focused culture may contribute to improve digital product and service innovation by the organization. A networked organization structure, independent of traditional hierarchies, may enable greater collaboration and an effective digital workplace.

Upon processing the inputs using the assessment model, the system may determine digital maturity results related to the assessment dimensions and the assessment sub-dimensions. In one embodiment, the digital maturity results may comprise current digital maturity levels, target digital maturity levels, and digital maturity gaps. The current digital maturity levels may indicate existing levels of digitalization of the organization. The target digital maturity levels may indicate levels of digitalization to be achieved by the organization. The digital maturity gaps may refer to differences between the target maturity levels and the current maturity levels.

Further, each of the current digital maturity levels and the target digital maturity levels may be selected from five distinct levels. The five distinct levels may be basic, silo'ed, integrated, responsive, and disruptive. Thus, each of the current digital maturity levels and the target digital maturity levels may be at least one of basic, silo'ed, integrated, responsive, and disruptive levels.

In one embodiment, a level 1 i.e. a basic digital maturity level may signify that the organization is a traditional, product and value chain focused enterprise having basic digital adoption. The basic digital adoption may indicate use of e-mails, internet and core enterprise applications. The basic digital maturity level may also signify low awareness about adoption by contemporary digital capabilities. A level 2 i.e. a silo'ed level may indicate a fragmented approach towards digital adoption by the organization. Further, the silo'ed level may indicate absence of a holistic enterprise digital strategy. A level 3 i.e. an integrated level may indicate establishment of a unified digital vision and strategy across business lines, by the organization. The integrated level may also signify that foundational digital capabilities of the organization are in place.

A level 4 i.e. a responsive level may imply a successful leveraging of the digital capabilities by the organization. At responsive level, the organization may use the digital capabilities for establishing a personalized and responsive customer experience. The responsive level may also indicate that the organization have put in place a digitally enabled and customer centric operating model with digitally empowered workforce. A level 5 i.e. disruptive level may indicate that the organization is able to facilitate market disrupting digital innovations. The market disrupting digital innovations may help the organization in improving brand perception, achieving gains in market shares and operational excellence.

Figure 3:
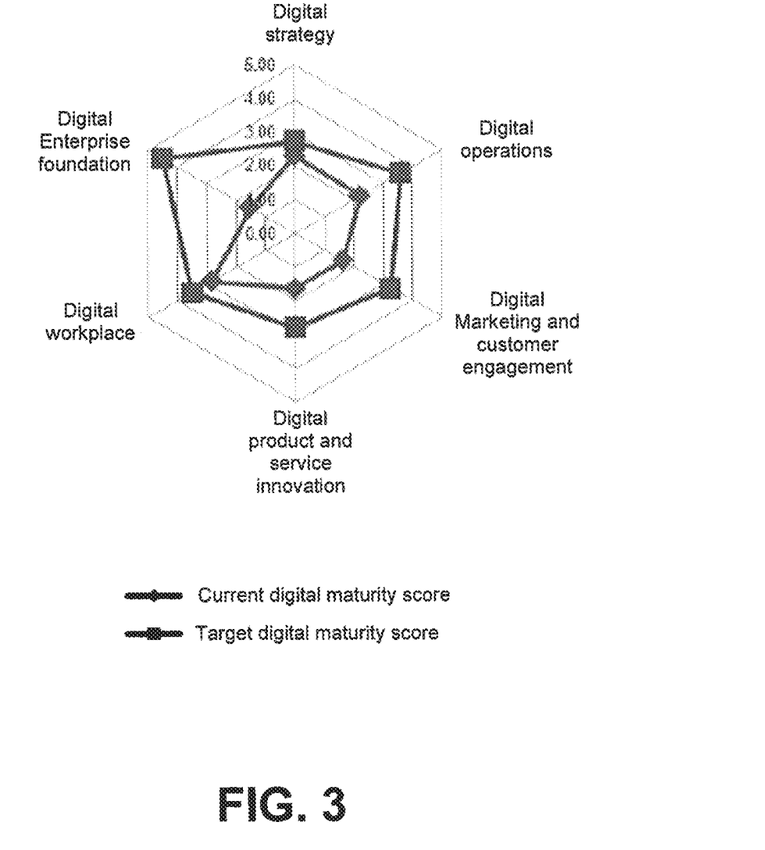
FIG. 3 illustrates a graphical representation of digital maturity results, in accordance with an embodiment of the present subject matter.

Post determining the digital maturity results, the system may visualize the digital maturity results using different graphical illustrations. Referring to FIG. 3, a graphical representation of the digital maturity results is explained. In the FIG. 3, the assessment dimension digital enterprise foundation has a current digital maturity level of 2 and the target maturity digital level is 5. Thus, the system may indicate a digital maturity gap as 3. Further, assessment dimension digital marketing and customer engagement has a current digital maturity level of 2 and the target maturity digital level is 3. Thus, the system may indicate the digital maturity gap as 1.

Post visualizing the digital maturity results, the system may suggest steps for achieving the target digital maturity levels. For an example, the current maturity level of the organization may be silo'ed and the target maturity level for the organization may be integrated, During such condition, the system may suggest to integrate digital customer channels with off-line channels to deliver an integrated customer experience. In another example, the current maturity level of the organization may be integrated and the target maturity level for the organization may be responsive. During such condition, the system may suggest to implement sense-and-respond systems for measuring real-time customer experience and delivering instant offers.

In one embodiment, the system may compute a digital maturity score for each of the assessment characteristics by using a weighted average of the assessment dimensions and the assessment sub-dimensions. The digital maturity score for each of the assessment characteristics may be computed based on a below mentioned equation 1.

$$\text{Digital maturity score} = \frac{\sum (\text{sub-dimension weight} * \text{sub-dimension score})}{\sum (\text{sub-dimension weight})} \quad \text{Equation 1}$$

Figure 4:
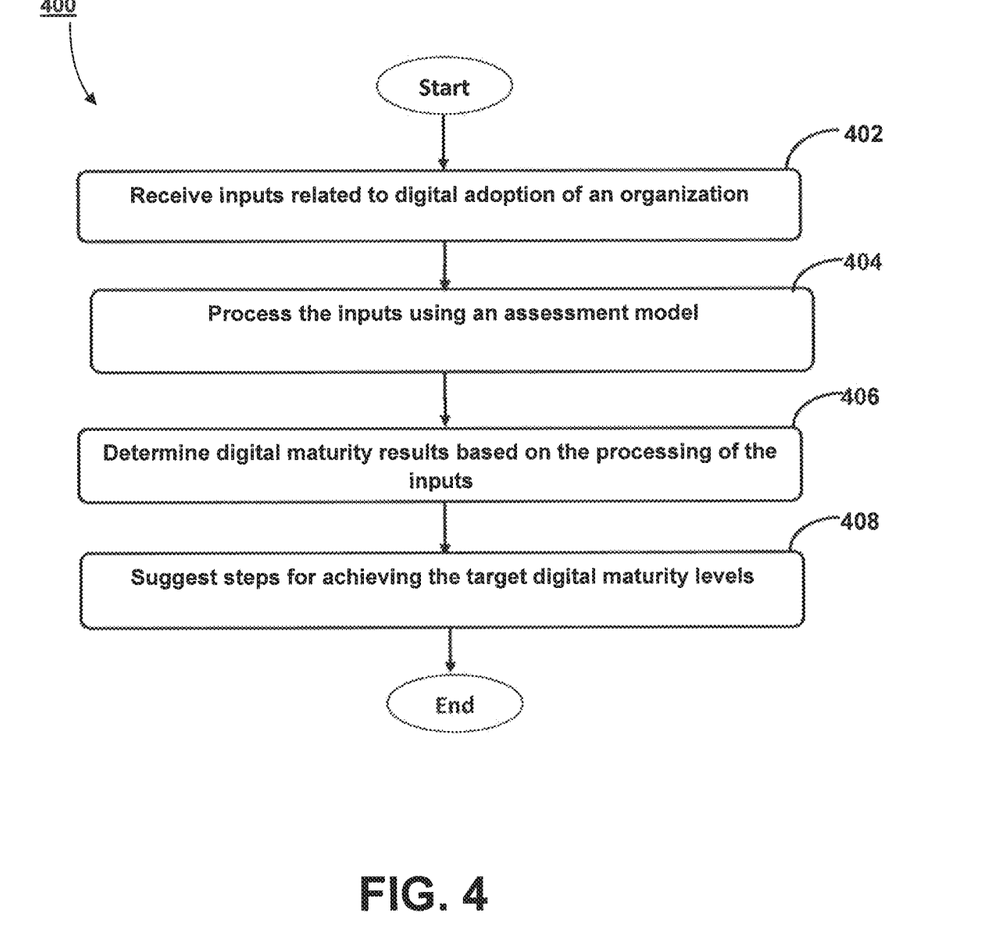
FIG. 4 show flowcharts illustrating a method for managing digital maturity of an organization, in accordance with an embodiment of the present subject matter.

Referring now to FIG. 4, a method 400 for managing digital maturity of an organization is described, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, inputs related to digital adoption by an organization may be received. In one implementation, the inputs may be received by the processor 110.

At block 404, the inputs may be processed using an assessment model. The assessment model may comprise assessment dimensions, assessment sub-dimensions, and assessment characteristics. The assessment dimensions may indicate tracks of digital adoption. The assessment sub-dimensions may indicate focus areas related to the tracks. The assessment characteristics may indicate capability criteria's related to the tracks. In one implementation, the inputs may be processed by the processor 110.

At block 406, digital maturity results may be determined based on the processing of the inputs. The digital maturity results may be related to the assessment dimensions and the assessment sub-dimensions. The digital maturity results may comprise current digital maturity levels, target digital maturity levels, and digital maturity gaps. In one implementation, the digital maturity results may be determined by the processor 110.

At block 408, steps for achieving the target digital maturity levels may be suggested. In one implementation, the steps for achieving the target digital maturity levels may be suggested by the processor 110.

Although implementations for methods and systems for managing digital maturity of an organization have been described in language specific to structural features and/or methods, it is to be understood that the appended claims are not necessarily limited to the specific features or methods described. Rather, the specific features and methods are disclosed as examples of implementations for managing digital maturity of an organization.

Exemplary embodiments discussed above may provide certain advantages, Though not required to practice aspects of the disclosure, these advantages may include those provided by the following features.

Some embodiments may enable a system and a method to identify relevant stakeholders and collect information related to digitalization of an organization.

Some embodiments may enable a system and a method to evaluate current digital maturity levels of an organization.

Some embodiments may enable a system and a method to identify opportunities for improvements and action recommendations for improving digital maturity of an organization.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional budding blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing digital maturity of an organization, the method comprising:

receiving, by a processor, inputs related to digital adoption by an organization, wherein the digital adoption of the organization comprise digitization of products, services, operational processes and workplace of the organization;

processing, by the processor, the inputs using an assessment model comprising assessment dimensions, assessment sub-dimensions, and assessment characteristics, wherein the assessment dimensions are related to the digital adoption by the organization, and the assessment dimensions indicate tracks of the digital adoption, the assessment sub-dimensions indicate focus areas related to the tracks, and the assessment characteristics indicate capability criteria's related to the tracks;

determining, by the processor, digital maturity of the organization based on the processing of the inputs, wherein the digital maturity is related to the assessment dimensions and the assessment sub-dimensions, and wherein the digital maturity of the organization comprise current digital maturity levels, target digital maturity levels, and digital maturity gaps, wherein the current digital maturity level and the target digital maturity level is at least one of basic, silo'ed, integrated, responsive, or disruptive; and achieving the target digital maturity levels related to the assessment dimensions and assessment sub-dimensions by providing action steps of digital solutions based on the current digital maturity levels, the target digital maturity levels, and the digital maturity gaps, wherein:

the assessment dimension digital operations is used to determine a current level of use of digital capabilities of the organization, the digital capabilities of the organization are used for cost optimization, reduce risks, increase process efficiency, and to improve process agility, and the cost optimization refers to digital delivery of products or information to reduce distribution costs, and reduced Information Technology (IT) infrastructure costs by use of cloud based applications.

2. The method of claim 1, further comprising visualizing the digital maturity using different graphical illustrations.

3. The method of claim 1, wherein when the current maturity level of the organization is silo'ed and the target maturity level for the organization is integrated, then the action recommendation is to integrate digital customer channels with off-line channels to deliver an integrated user experience, and when the current maturity level of the organization is integrated and the target maturity level for the organization is responsive, then the action recommendation is to implement sense-and-respond systems for measuring real-time user experience and delivering instant offers.

4. The method of claim 1, further comprises assigning weights to the assessment dimensions, the assessment sub-dimensions and the assessment characteristics based on an importance for digital adoption by the organization, wherein the weights assigned by the system include Low, Medium, and High weights; and computing a digital maturity score for each of the assessment characteristics by using a weighted average of the assessment dimensions and the assessment sub-dimensions.

5. A system for managing digital maturity of an organization, the system comprises:

a process;

a memory coupled to the processor, wherein the processor is capable for executing programmed instructions stored in the memory to:

receive inputs related to digital adoption by an organization, wherein the digital adoption of the organization comprise digitization of products, services, operational processes and workplace of the organization;

process the inputs using an assessment model comprising assessment dimensions, assessment sub-dimensions, and assessment characteristics, wherein the assessment dimensions are related to the digital adoption by the organization, and the assessment dimensions indicate tracks of digital adoption, the assessment sub-dimensions indicate focus areas related to the tracks, and the assessment characteristics indicate capability criteria's related to the tracks;

determine digital maturity of the organization based on the processing of the inputs, wherein the digital maturity is related to the assessment dimensions and the assessment sub-dimensions, and wherein the digital maturity of the organization comprise current digital maturity levels, target digital maturity levels, and digital maturity gaps, wherein the current digital maturity level and the target digital maturity level is at least one of basic, silo'ed, integrated, responsive, or disruptive; and achieving the target digital maturity levels related to the assessment dimensions and assessment sub-dimensions by providing action steps of digital solutions based on the current digital maturity levels, the target digital maturity levels, and the digital maturity gaps wherein:
the assessment dimension digital operations is used to determine a current level of use of digital capabilities of the organization,
the digital capabilities of the organization are used for cost optimization, reduce risks, increase process efficiency, and to improve process agility, and
the cost optimization refers to digital delivery of products or information to reduce distribution costs, and reduced Information Technology (IT) infrastructure costs by use of cloud based applications.

6. The system of claim 5, further comprising visualizing the digital maturity results using different graphical illustrations.

7. The system of claim 5, wherein when the current maturity level of the organization is silo'ed and the target maturity level for the organization is integrated, then the action recommendation is to integrate digital customer channels with off-line channels to deliver an integrated user experience, and when the current maturity level of the organization is integrated and the target maturity level for the organization is responsive, then the action recommendation is to implement sense-and-respond systems for measuring real-time user experience and delivering instant offers.

8. The system of claim 5, further comprises assigning weights to the assessment dimensions, the assessment sub-dimensions and the assessment characteristics based on an importance for digital adoption by the organization, wherein the weights assigned by the system include Low, Medium, and High weights; and computing a digital maturity score for each of the assessment characteristics by using a weighted average of the assessment dimensions and the assessment sub-dimensions.

9. A non-transitory computer readable medium embodying a program executable in a computing device for managing digital maturity of an organization, the program comprising:
a program code for receiving inputs related to digital adoption by an organization, wherein the digital adoption of the organization comprise digitization of products, services, operational processes and workplace of the organization;
a program code for processing the inputs using an assessment model comprising assessment dimensions, assessment sub-dimensions, and assessment characteristics, wherein the assessment dimensions are related to the digital adoption by the organization, and the assessment dimensions indicate tracks of the digital adoption, the assessment sub-dimensions indicate focus areas related to the tracks, and the assessment characteristics indicate capability criteria's related to the tracks;
a program code for determining digital maturity of the organization based on the processing of the inputs, wherein the digital maturity is related to the assessment dimensions and the assessment sub-dimensions, and wherein the digital maturity of the organization comprise current digital maturity levels, target digital maturity levels, and digital maturity gaps, wherein the current digital maturity level and the target digital maturity level is at least one of basic, silo'ed, integrated, responsive, or disruptive; and
a program code for achieving the target digital maturity levels related to the assessment dimensions and assessment sub-dimensions by providing action steps of digital solutions based on the current digital maturity levels, the target digital maturity levels, and the digital maturity gaps
wherein:
the assessment dimension digital operations is used to determine a current level of use of digital capabilities of the organization,
the digital capabilities of the organization are used for cost optimization, reduce risks, increase process efficiency, and to improve process agility, and
the cost optimization refers to digital delivery of products or information to reduce distribution costs, and reduced Information Technology (IT) infrastructure costs by use of cloud based applications.

10. The method of claim 1, wherein an assessment dimension digital product and service innovation is used to evaluate an ability of the organization to leverage digital capabilities for innovation of the product or service, wherein leveraging the digital capabilities enables enhancing existing products and services by using digital technologies, and developing digitally enabled products and integration with numerous digital service providers.

11. The method of claim 1, wherein an assessment dimension digital strategy is used to evaluate clarity, breadth, and consistency of vision and objectives for digitalization of the organization, wherein a digital strategy is used to evaluate process of digital strategy development and governance of the organization with respect to the digital strategy and Key Performance Indicators (KPI's) defined in the assessment model.

* * * * *